3,362,945
POLYMERIZATION OF ETHYLENE AND CATALYST COMPRISING VINYL TITANIUM HALIDE AND ALUMINUM TRIALKYL
Vernon D. Floria, Midland, and Leo F. Rokosz, Linwood, Mich., assignors to The Dow Chemical Company, Midland, Mich., a corporation of Delaware
No Drawing. Filed May 11, 1964, Ser. No. 366,622
9 Claims. (Cl. 260—94.3)

This invention relates to a novel catalyst system for the polymerization of unsaturated compounds and more particularly to the use of a two component catalyst system using organic metallic compounds for promoting rapid polymerization of unsaturated hydrocarbons, such as ethylene and dienes at relatively low temperatures and pressures.

It is an object of this invention to provide a novel catalyst system for initiating the polymerization of unsaturated hydrocarbons.

A further object of this invention is to provide a novel process whereby ethylene and dienes can be readily polymerized by catalytical means to give high yields of solid polymers.

Other and further objects and advantages will become apparent to those skilled in the art upon consideration of the accompanying disclosure.

According to this invention, ethylene and conjugated diolefin monomers either singly or in admixture are readily polymerized and high yields are obtained by effecting the polymerization in the presence of a catalytic mixture containing a trialkyl aluminum and the product obtained by reacting vinyl magnesium halide

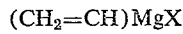

$$(CH_2=CH)MgX$$

wherein X represents a halide radical such as Cl, Br, I, F with a titanium tetrahalide, or, as this reaction product will be herein referred to, vinyl titanium halide.

The invention is applicable to polymerizing ethylene and any of the well known conjugated diolefinic hydrocarbons and preferably those containing 4 to 10 carbon atoms. The invention is particularly applicable for polymerizing ethylene, butadiene, and isoprene, and copolymers such as ethylene-butadiene copolymers can be prepared using the catalysts of the present invention.

The trialkylaluminum component of the caltalyst mixture of the present invention can be represented by the general formula $R_3Al$, where R is an alkyl radical, preferably containing from 1 to 12, inclusive, carbon atoms. Examples of compounds corresponding to the aforementioned formula which can be used include trimethylaluminum, triethylaluminum triisobutylaluminum, tri-n-butylaluminum, tri-n-pentylaluminum, triisooctylaluminum, tri-n-dodecylaluminum, and the like.

The vinyl titanium halide component of the catalyst mixture of the present invention may be prepared by first reacting a vinyl halide such as vinyl chloride with magnesium in tetrahydrofuran according to the method of Hauser and Hance (Journal American Chemical Society, 73, 5846 (1951)) to form the vinyl magnesium halide. The vinyl magnesium halide is then reacted with a titanium tetrahalide such as titanium tetrachloride, at a molar ratio of vinyl magnesium halide to titanium tetrahalide in the range of about 1:1 to about 4:1, a molar ratio of 2:1 being preferred, in a suitable organic solvent such as tetrahydrofuran or hydrocarbon solvent such as pentane while maintaining the reaction temperature preferably below 10° C. If temperatures in excess of 10° C. are employed for the reaction of the vinyl magnesium halide with the titanium halide, lower yields of polymer will be obtained when the vinyl titanium halide is used in the olefin polymerization catalyst mixture. The reaction mixture may be stirred from one to four hours or more, while the solution is allowed to warm to room temperature. The organic solvent may then be removed from the product under reduced pressure or other suitable means to recover the solid vinyl titanium halide reaction product which is then stored under an inert atmosphere such as nitrogen.

Suitable titanium tetrahalides with which vinyl magnesium chloride may be reacted to prepare the vinyl titanium halide component of the catalyst mixture of the present invention may be any of the titanium tetrahalides including the chlorides, bromides, and iodides, the tetrachloride of titanium being preferred.

A particularly suitable heterogeneous catalyst system of this invention is one using vinyl titanium chloride, i.e. the reaction product of vinyl magnesium chloride and titanium tetrachloride, and an aluminum trialkyl such as aluminum triethyl.

The amount of the catalyst components employed in the polymerization process of the present invention can be varied rather widely, depending upon the particular monomer used and the operating conditions. In general, the catalyst mixture is comprised of about 10 to about 40 percent by weight of the vinyl titanium halide and about 60 to about 90 percent by weight of the trialkyl aluminum compound.

The concentration of vinyl titanium halide catalyst in the polymerization zone is usually in the range of .05 to 1.0 weight percent, based on the inert polymerization vehicle charged to that zone.

The polymerization reaction is carried out with the components of the reaction dispersed throughout an inert liquid vehicle and, when the olefin to be polymerized is normally a gas, the latter can be bubbled through the liquid vehicle which contains the catalyst system. Examples of the preferred liquid vehicles are aliphatic, cycloaliphatic, and hydrogenated aromatic hydrocarbons, such as pentane, hexane, clyclohexane, heptane, tetrahydronaphthalene, decahydronaphthalene, the higher paraffins, and mixtures thereof. Aromatic hydrocarbons such as benzene, xylene, halogenated aromatic hydrocarbons, such as orth-dichlorobenzene and chlorinated napthalene and mixtures thereof may also be used.

Generally, the polymerization of this invention can be conducted over a rather broad temperature range, namely, from about 20° C. to about 120° C., preferably in the range of 70° C. to about 90° C. However, improved effects of this catalyst system are observed at temperatures even below room temperature.

It is unnecessary to employ elevated pressures in order to bring about the polymerization according to the present invention. However, for convenience of handling normally gaseous monomers, such as ethylene, it is sometimes advantageous to employ slightly elevated pressures. Most suitably the present invention is carried out under a pressure between atmospheric and 500 pounds per square inch gauge (p.s.i.g.). For the polymerization of ethylene, a pressure range of 10 p.s.i.g. to 100 p.s.i.g. is desirable.

The preparation of the catalyst system and the subsequent polymerization are preferably carried out in the absence of molecular oxygen, carbon monoxide, carbon dioxide, and water. Most suitably, all reactions are carried out in an atmosphere of the monomer being polymerized if this is a gas, or, if the monomer is a liquid, in an atmosphere of an inert gas such as nitrogen. The catalyst systems or their components are destroyed by reaction with oxygen, carbon monoxide, carbon dioxide, or water and consequently, if any of these are present in excess, no polymerization will take place.

Polymerization according to the process of the present invention can be brought about by mixing the essential components of the catalyst system in a suitable inert liquid vehicle and then adding the monomer to the catalyst system so formed. The process may be carried out batchwise or continuously and by its use high yields of polymers can be produced. The residence time used in a continuous process can vary widely since it depends to a great extent upon the temperature at which the process is carried out and upon the specific monomer that is to be polymerized. However, the residence time in a continuous process generally falls within the range of one second to an hour or more. In a batch process, the time for the reaction can also vary widely, such as from 15 minutes up to 24 hours or more.

Upon completion of the polymerization reaction, any excess monomer is vented and the contents of the reactor are then treated by any suitable method to inactivate the catalyst and remove the catalyst residues. In one method, inactivation of the catalyst is accomplished by washing with an alcohol, water, or other suitable materials. The polymer is then separated from the diluent, e.g., by decantation, filtration, or other suitable method after which the polymer is dried.

The polymer may be recovered from the filtrate by suitable evaporation techniques.

The practice of this invention is best illustrated by the following examples. The techniques and conditions normally used in heterogeneous catalyst systems are suitable for the practice of this invention. These examples are given merely by way of illustration and are not intended to limit the scope of the invention in any way nor the manner in which the invention can be practiced. Throughout the specification, where reference is made to "polymers" and "polymerization," it is intended that these terms embrace "copolymers" and "copolymerization" unless otherwise indicated.

*Example 1*

As a test, not exemplary of the present invention, ethylene was polymerized in the following manner.

To a stirred autoclave jacketed to control temperature which has been previously evacuated to prevent the catalyst from coming in contact with air was charged one liter of dry hexane, in which was dispersed a catalyst composition comprised of 0.5 millimole of $\alpha$-TiCl$_3$ and 8 millimoles of triethyl aluminum. The autoclave was then pressurized to 50 p.s.i.g. total pressure with ethylene gas and then heated to 90° C. Stirring and heating of the mixture was continued for 2 hours after which time the autoclave was cooled and vented to atmospheric pressure. The catalyst was decomposed by the addition of a small quantity of alcohol and the solid polymer isolated from the mixture by filtration. There was obtained after drying a 45.5 gram yield of polymer.

*Example 2*

Seventy-five grams of vinyl chloride dissolved in 300 milliliters of tetrahydrofuran, was reacted with 24 grams of magnesium according to the method of Hauser and Hance (Journal of the American Chemical Society, 73, 5846 (1951)) using ethyl iodide as a catalyst. A portion of this solution containing 0.25 mole of the vinyl magnesium chloride reaction product was added dropwise to a tetrahydrofuran solution containing 0.125 mole titanium tetrachloride. The reaction temperature was kept below 10° C. After stirring for 4 hours, the solution was allowed to warm to room temperature. The vinyl titanium chloride was recovered as a grey-brown solid which was kept under a nitrogen atmosphere.

A mixture of 0.5 gram of this vinyl titanium halide (35.5 percent by weight of the mixture) and 0.91 gram of triethyl aluminum (64.5 percent by weight of the mixture) was prepared in 25 milliliters hexane contained in a flask. The resultant suspension was shaken periodically for about 10 minutes after which time the contents of the flask were added along with 1 liter of hexane to a stirred autoclave jacketed to control temperature which had been previously dried and evacuated to prevent the catalyst from coming in contact with water or air. The autoclave was then pressurized to 10 p.s.i.g. with ethylene gas and then heated to 90° C. The ethylene pressure was raised to 50 p.s.i.g. and stirring and heating of the mixture was continued for two hours after which time the autoclave was cooled and vented to atmospheric pressure. The catalyst was deactivated by the addition of 50 milliliters of isopropanol and the solid polymer isolated from the mixture by filtration. There was obtained after drying an 89.5 gram yield of polymer.

By way of contrast, when 1.8 grams of the vinyl titanium chloride was employed as a catalyst without the addition of the triethylaluminum for the polymerization of ethylene following the above procedure, no polymer was formed.

*Example 3*

The procedure of Example 2 for the preparation of the vinyl titanium chloride-triethyl aluminum catalyst was repeated, with the exception that the reaction temperature for the preparation of the vinyl titanium chloride was kept at ambient temperature, that is, about 35° C. The catalyst mixture was used for the polymerization of ethylene following the ethylene polymerization procedure of Example 1. Polymer yield obtained was 51 grams.

*Example 4*

The procedure of Example 2 was repeated for the preparation of the divinyl titanium dichloride-triethylaluminum catalyst and the resultant catalyst suspension in hexane was added along with 1 liter of hexane to a stirred autoclave, jacketed to control temperature which had been previously dried and evacuated to prevent the catalyst from coming into contact with water or air.

1,3-butadiene was added to the autoclave and the autoclave heated to 70° C. Pressure in the autoclave was maintained at 15 p.s.i.g. and stirring and heating of the mixture was maintained for 2 hours after which time the autoclave was cooled and vented to atmospheric pressure. The catalyst was deactivated with isopropanol and the solid polymer isolated from the mixture by vacuum distillation of the hexane solvent.

There was obtained after distillation a three gram yield of polymer.

In place of the vinyl titanium chloride used in the catalyst mixture in Example 4 there may be substituted an equivalent amount of other vinyl titanium halides such as vinyl titanium bromide and vinyl titanium iodide; in place of the triethylaluminum component of the catalyst mixture in Example 4 there may be substituted an equivalent amount of other trialkyl aluminum compounds such as aluminum trimethyl, aluminum tripropyl and aluminum tributyl to catalyze the polymerization of such conjugated diolefinic monomers as isoprene with substantially similar results.

What is claimed is:

1. As a composition of matter a polymerization catalyst mixture comprising from about 60 to about 90 percent by weight of a trialkylaluminum and from about 10 to about 40 percent by weight of vinyl titanium halide in which the titanium is titravalent.

2. The composition of claim 1 wherein the trialkyl aluminum is triethylaluminum.

3. The composition of claim 1 wherein the vinyl titanium halide is vinyl titanium chloride.

4. The composition of claim 1 wherein the trialkyl aluminum is triethyl aluminum and the vinyl titanium halide is vinyl titanium chloride.

5. A process for the polymerization of unsaturated hydrocarbons selected from the group consisting of ethylene and conjugated diolefins which comprises effecting the polymerization in an inert hydrocarbon liquid and in the presence of a catalyst system comprising a mixture of from about 60 to about 90 percent by weight of a trialkylaluminum and from about 10 to about 40 percent by weight of vinyl titanium halide in which the titanium is tetravalent.

6. The process of claim 5 wherein the polymerization is effected at a temperature in the range of about 20° to about 120° C. and a pressure of from normal atmospheric to 500 p.s.i.g.

7. The process of claim 5 wherein the trialkylaluminum component of the catalyst system is triethylaluminum.

8. The process of claim 5 wherein the vinyl titanium halide is vinyl titanium chloride.

9. The process of claim 5 wherein the trialkyl aluminum is triethyl aluminum and the vinyl titanium halide is vinyl magnesium chloride.

References Cited

UNITED STATES PATENTS

| | | | |
|---|---|---|---|
| 3,060,161 | 10/1962 | D'Alelio | 260—93.5 |
| 2,954,367 | 9/1960 | Vandenberg | 260—94.9 |
| 2,945,846 | 7/1960 | Wisseroth | 260—94.9 |

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,362,945                                                      January 9, 1968

Vernon D. Floria et al.

It is hereby certified that error appears in the above numbered patent requiring correction and that the said Letters Patent should read as corrected below.

Column 6, line 2, for "magnesium" read -- titanium --.

Signed and sealed this 25th day of February 1969.

(SEAL)
Attest:

Edward M. Fletcher, Jr.                                      EDWARD J. BRENNER
Attesting Officer                                                  Commissioner of Patents